| United States Patent [19] | [11] Patent Number: 5,049,651 |
|---|---|
| Heinz et al. | [45] Date of Patent: Sep. 17, 1991 |

[54] PROCESS FOR THE PREPARATION OF BRANCHED (CO)POLYAMIDES BY SOLID PHASE POST-CONDENSATION, AND CORRESPONDING (CO)-POLYAMIDES

[75] Inventors: Hans-Detlef Heinz; Rolf-Volker Meyer, both of Krefeld, Fed. Rep. of Germany

[73] Assignee: Bayer Aktiengesellschaft, Leverkusen-Bayerwerk, Fed. Rep. of Germany

[21] Appl. No.: 402,886

[22] Filed: Sep. 1, 1989

[30] Foreign Application Priority Data

Sep. 17, 1988 [DE] Fed. Rep. of Germany ....... 3831708

[51] Int. Cl.$^5$ ............................................. C08G 69/46
[52] U.S. Cl. .................................... 528/480; 528/312; 528/323; 528/324; 528/328; 528/329.1; 528/336; 528/481; 528/503
[58] Field of Search ............... 528/480, 481, 503, 312, 528/323, 324, 328, 329.1, 336

[56] References Cited

U.S. PATENT DOCUMENTS 4,892,927  1/1990  Meyer et al. ..................... 528/312

FOREIGN PATENT DOCUMENTS 39-12139  6/1964  Japan ................................ 528/328

*Primary Examiner*—Harold D. Anderson
*Attorney, Agent, or Firm*—Connolly & Hutz

[57] ABSTRACT

The invention relates to a process for the solid phase post-condensation of (co)polyamides which contain small amounts of lysine components and about equivalent amounts thereto of a polycarboxylic acid incorporated. Thermoplastically deformable, slightly branched aliphatic (co)polyamides having increased melt viscosity and pronounced pseudoplasticity are obtained in a shortened reaction time. The invention also relates to solid phase post-condensed (co)polyamides of this type.

4 Claims, No Drawings

PROCESS FOR THE PREPARATION OF BRANCHED (CO)POLYAMIDES BY SOLID PHASE POST-CONDENSATION, AND CORRESPONDING (CO)-POLYAMIDES

The invention relates to a process for the solid phase post-condensation of (co)polyamides which contain small amounts of lysine components and about equivalent amounts thereto of a polycarboxylic acid incorporated. Thermoplastically deformable, slightly branched aliphatic (co)polyamides having increased melt viscosity and pronounced pseudoplasticity are obtained in a shortened reaction time. The invention also relates to solid phase post-condensed (co)polyamides of this type.

Polyamides are a class of polymers which have been established for many years for a large number of practical applications, which can be prepared by various methods, synthesised from very different polyamide-forming building blocks and which can be provided in a specific application case, alone and also combined with, for example, processing auxiliaries, stabilizers, polymeric alloying components and also mineral reinforcing materials (such as, for example, fillers or glass fibres), to give materials having specifically adjusted property combinations.

Thus polyamides are employed industrially in large amounts for the preparation of fibres, moulded plastic parts and films, but also, for example, as hot-melt adhesives and auxiliaries in a large number of applications.

While lactams can be converted cationically, hydrolytically (with addition of water) and also anionically to give polyamides, essentially only the polycondensation reaction is suitable for polyamide preparation from polyamide-forming monomers such as diamines, dicarboxylic acids or suitable derivatives and aminocarboxylic acids, even combined with lactams (see Vieweg, Müller; Kunststoff-Handbuch (Plastic Handbook), vol. VI, p. 11 et seq., Carl-Hanser-Verlag, Munich 1966).

Even in the preparation of polyamides from lactams, for example of polyamide 6 from ε-caprolactam, "hydrolytic polymerization/polycondensation" has the greatest significance. In this application, "melt polycondensation" should be taken to mean both processes.

A large number of procedures have been disclosed for the preparation of polyamides, where, depending on the desired final product, different monomer building blocks are employed for the determination of the matrix type, various chain controllers are employed for adjusting a desired average molecular weight or also monomers having "reactive" groups are employed for post-treatments planned for later (for example amino groups or sulphonate groups for better dyeability of fibres with acidic or basic dyes).

Continuous preparation processes are known, as is batchwise production, for example in autoclaves.

All methods for the preparation of (co)polyamides by polycondensation or by hydrolytic polymerization of lactams have, however, in common that starting from suitable monomer mixtures, the preparation of the (co)polyamides takes up many hours of reaction time until the polyamides attain sufficiently high molecular weight for the spinning of threads from the polymer melt or the molecular weights are sufficiently high for the planned practical use.

Independently of the long reaction time, in many cases a post-condensation is still necessary—for example in the solid phase—in order to attain still greater molecular weights. This solid phase post-condensation also generally necessitates considerable residence times at high temperatures, with products possessing particularly high melt viscosity, such as are desired for many extrusion applications, requiring particularly high residence times because of the decreasing reaction rate with increasing molecular weight.

The reaction times necessary for the preparation of the customary (co)polyamides thus seriously limit the capacity of the manufacturing plants.

A substantial shortening of the reaction times in the preparation of very high molecular weight (co)polyamides having a high melt viscosity—without sacrificing the known good applicational properties of the products—should thus to be seen as a large, in particular cost-saving advance.

Surprisingly, it has now been found that the solid phase post-condensation times for the preparation of polyamides from lactams and/or diamine/dicarboxylic acid mixtures or the corresponding nylon salts or suitable derivatives and/or aminocarboxylic acids or suitable derivatives can be considerably shortened if small amounts of lysine components and about equivalent amounts to the lysine component of a polycarboxylic acid, preferably a dicarboxylic acid, are added to the polyamide-forming starting substances.

The invention therefore relates to a process for the preparation of (co)polyamides having high melt viscosities, from lactams and/or diamine/dicarboxylic acid mixtures or their salts and/or suitable derivatives thereof and/or aminocarboxylic acids or suitable derivatives thereof by solid phase post-condensation, characterized in that (co)polyamides are employed which contain 0.1 to 2.0% by weight, preferably 0.2 to 1.0% by weight, in particular 0.3 to 0.9% by weight, of lysine segments

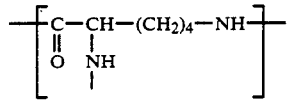

and in about equivalent amounts thereto of polycarboxylic acid segments and, for the solid phase post-condensation, are heated in vacuo or in an inert gas for 0.5 to 30 hours, preferably 1 to a maximum of 20 hours, at 140° to 250° C., preferably 160° to 230° C., but always at least 10° C., preferably at least 20° C., below the respective melting point of the (co)polyamide.

The invention also relates to the lysine/polycarboxylic acid-modified (co)polyamides thus obtained and to moulded articles prepared therefrom.

Many experiments have been described to obtain basic polyamides by cocondensation with polyamide-forming building blocks containing basic groups which, in particular when used as fibres, can be dyed more easily with acidic dyes. Thus, in U.S. Pat. No. 3,651,023, for example, it is disclosed that using a series of different additives of this type, an improved dyeability of polyamide fibres and a higher colour intensity can be achieved.

As one of a number of examples of additives to be used, lysine is also mentioned in the application. The polyamides described in the Examples 1, 2 and 9 to 12 do not differ in character from the others, apart from the improved dyeability. In particular, the examples show that the addition of lysine alone or in combination with a monocarboxylic acid permits no shortening of the reaction time at all. A reference to the use of lysine hydrochlorides is completely lacking.

The (co)polyamides suitable for the solid phase postcondensation process according to the invention with incorporated lysine segments can be prepared by various methods.

Thus the use of separately prepared salts of lysine and aliphatic $C_2$-$C_{10}$-dicarboxylic acids in the melt polycondensation of polyamides is disclosed in Japanese Published Patent Application 12,139/64. The lysine salts are added in an amount from 0.5 to 5% by weight, preferably 1.0 to 3% by weight.

JA 12,139/64 contains no reference at all to an influence of the measures described there on the postcondensability of the products.

An improved process for the preparation of the (co)polyamides containing lysine segments is disclosed in copending Ser. No. 402,617, filed Sept. 5, 1989.

In the latter, instead of the pre-formed lysine/dicarboxylic acid salts, lysine components and polycarboxylic acids are added to the polyamide-forming reaction mixture before or at the beginning of the reaction, if desired stepwise, without preceding salt formation. Even using small amounts, a rapid polycondensation reaction to the (co)polyamide is achieved here; these (co)polyamides can be postcondensed in an outstanding manner by the solid phase post-condensation claimed according to the invention to give branched (co)polyamides having very high molecular weights, high melt viscosities and pseudoplasticities, in a short reaction time.

In the abovementioned application, the manner of preparation of (co)polyamides containing lysine segments of the type to be employed according to the invention is also described, which is based on the fact that lysine or lysine ester monohydrochlorides or dihydrochlorides and about equivalent amounts (i.e. HCl-binding amounts) of inorganic bases (such as NaOH, KOH, NaHCO$_3$, Na$_2$CO$_3$, KHCO$_3$ or K$_2$CO$_3$) are added to the polyamide melt condensation mixture.

Polyamide starting materials

Suitable lactams within the meaning of the invention are ω-lactams having 5 to 13 C-ring members such as, for example, ε-caprolactam, oenantholactam, caprylolactam and laurolactam alone or as a mixture, preferably ε-caprolactam and laurolactam. ε-Caprolactam is particularly preferably employed.

Suitable diamines are, for example, $C_2$-$C_{20}$-alkylenediamines, such as tetramethylenediamine, hexamethylenediamine, dodecamethylenediamine and the like and cycloalkylenediamines such as 1,4-diaminocyclohexane, bis(4-aminocyclohexyl)methane, 5-amino-1-aminomethyl-1,3,3-trimethylcyclohexane (isophoronediamine) and the further diamines known for polyamide preparation, such as are known individually or as a mixture in the prior art.

Suitable dicarboxylic acids are aliphatic $C_2$-$C_{38}$-dicarboxylic acids such as, for example, adipic acid, azelaic acid, dimerized fatty acids and aromatic $C_6$-$C_{14}$-dicarboxylic acids such as, for example, isophthalic acid, terephthalic acid and the like and cycloalkylenedicarboxylic acids such as, for example, 1,3- or 1,4-cyclohexanedicarboxylic acid or mixtures thereof. Instead of the dicarboxylic acids themselves, under certain circumstances suitable derivatives such as, for example, esters can also be employed in the diaminedicarboxylic acid mixtures.

The polycarboxylic acids to be employed together with the lysine components in approximately equivalent amounts are also selected from the polycarboxylic acids mentioned. Higher alkylenedicarboxylic acids having ≧6 C atoms such as dodecanoic acid dimeric fatty acids, cycloaliphatic dicarboxylic acids such as 1,3- or 1,4-cyclohexanedicarboxylic acids or (less preferred) aromatic dicarboxylic acids such as isophthalic acid or terephthalic acid are preferred. However, all more highly functionalized polycarboxylic acids or their anhydrides may also be employed.

Suitable amino acids for the preparation of the polyamides are, for example ω-$C_4$-$C_{18}$-aminocarboxylic acids such as, for example, aminocaproic acid, aminoundecanoic acid and aminoheptanoic acid.

Preferred diamines are hexamethylenediamine, tetramethylenediamine and dodecamethylenediamine.

Preferred dicarboxylic acids are adipic acid, azelaic acid, sebacic acid and decamethylenedicarboxylic acid and dimerized fatty acids.

Preferred aminocarboxylic acids are aminocaproic acid and aminoundecanoic acid.

Preferred diamine/dicarboxylic acid mixtures or nylon salts are those of hexamethylenediamine and adipic acid or sebacic acid or azelaic acid, those of tetramethylenediamine and adipic acid and those of dodecamethylenediamine and decamethylenedicarboxylic acid.

The polyamide building blocks may be employed in virtually any mixtures; however, aliphatic polyamides or those which only contain a minor amount (<40% by weight) of aromatic units are preferred.

Lysine components

Besides lysine (2,6-diaminohexanoic acid) itself, lysine hydrate or esters of lower ($C_1$-$C_4$) alcohols such as, for example, lysine methyl ester may also be employed. Preferably, lysine hydrate or aqueous solutions of lysine are employed, it being possible to use lysine in any enantiomeric forms or mixtures thereof.

Both the individual enantiomeric lysine monohydrochlorides or dihydrochlorides (D- or L-form) and any mixtures, including the racemates, may also be employed. Lysine ester monohydrochlorides and lysine ester dihydrochlorides may also be employed according to the invention. With dihydrochlorides, 2 equivalents of the inorganic base must then be employed. Suitable alcohol components in lysine ester monohydrochlorides and dihydrochlorides are, in particular, low-boiling alcohols such as methanol and ethanol. Preferred lysine hydrochlorides are L-lysine dihydrochloride, DL-lysine monohydrochloride and L-lysine monohydrochloride. L-Lysine monohydrochloride is particularly preferred.

L-Lysine monohydrochloride is produced industrially by, for example, fermentation processes (see Ullmanns Encyclopädie der technischen Chemie (Ullmann's Encyclopaedia of Industrial Chemistry), 4th revised and extended edition, vol. 7, Verlag Chemie, Weinheim/Bergstrasse, 1974).

Suitable inorganic bases are, for example, oxides, hydroxides and carbonates of various metals, for example sodium hydroxide, potassium hydroxide, sodium carbonate, potassium carbonate, sodium bicarbonate or potassium bicarbonate, magnesium hydroxide, magnesium carbonate, calcium hydroxide, sodium oxide, copper hydroxide, copper carbonate, calcium carbonate, manganese hydroxide, manganese carbonate and the like.

Preferred inorganic bases are sodium hydroxide, potassium hydroxide, sodium carbonate and potassium carbonate. Sodium hydroxide and potassium hydroxide are particularly preferably employed.

The addition of the lysine/polycarboxylic acid/optional bases is carried out separately or together, in each case advantageously, however, before or at the beginning of the polycondensation.

The lysine components are used in those proportions in the (co)polyamides that their lysine segment content in the (co)polyamide is 0.1 to 2.0% by weight, preferably 0.2 to 1.0, in particular 0.3 to 0.9% by weight. The amounts of polycarboxylic acid and inorganic base are about equivalent, i.e. about equivalent amounts of inorganic base to the amount of HCl are employed and, with polycarboxylic acids, about equivalent amounts of COOH groups of the polycarboxylic acids to the second amino group in lysine are employed.

In the polycondensation, the lysine segments

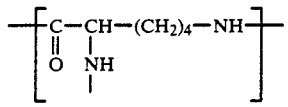

and the polycarboxylic acid segments, preferably dicarboxylic acid segments form

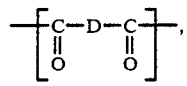

where D is the radical of the dicarboxylic acid without the carboxyl groups.

The polycondensation can be carried out continuously or batchwise.

Stabilizers such as, for example, metal salts (copper I/manganese II salts) and sterically hindered phenols or amines or other known compounds having a stabilizing effect or any impact strength modifiers, known from the prior art in large numbers, may also be mixed with the polyamides.

Furthermore, additives such as nucleating agents, pigments, dyes, carbon black, lubricants and other fillers and also kaolin or glass fibres may be contained.

In accordance with the invention, the polyamides prepared according to the invention are subjected to the solid phase post-condensation reaction, (co)polyamides based on PA 6 and 66 or 6/66 and 4/6 being preferred.

For this purpose, PA granules are heated in vacuo or under an inert gas for a desired period in a temperature range from 140° to 250°, preferably 160° to 230° C., but always at least 10° C., preferably at least 20° C., below the melt temperature of the respective (co)polyamide. The longer the period selected, the higher the molecular weights achieved.

The solid phase post-condensation may be carried out batchwise, for example in a tumble dryer or helical mixer, and continuously. Preferably, $N_2$ is used as the inert gas.

The post-condensation times are expediently selected in the range from 0.5 to 30 h, preferably 1.0 to 20 h, the longer reaction times preferably being used at lower temperatures and inversely. In this manner, products having very high melt viscosity, which the invention also relates to, can be prepared. These types are particularly suitable for use in the extrusion field.

Particularly preferred (co)polyamides are those based on polyamide 6 or those polyamides which are rich in caprolactam units.

The polyamides obtained according to the invention have characteristically higher melt viscosities in comparison to known comparison products having a comparable solution viscosity ($\eta_{rel}$, 1% strength in m-cresol at 25° C.) and generally show a pronounced pseudoplasticity. This rheological behaviour suggests a slightly branched structure.

Products having very high melt viscosity are in particular those which have melt viscosities $\geq 1200$ Pa.s/270° C. at a shear rate of about 1 $sec^{-1}$. They are particularly suitable for the extrusion and blow-moulding field.

The partly branched (co)polyamides, prepared by the solid phase post-condensation process according to the invention can be employed in all fields in which polyamides are customarily used, for example in injection moulding, extrusion, blow-moulding, the production of fibres and films and other objects. Essentially, they have properties comparable to those of comparison products, but are better suited for some processing purposes and can be prepared relatively economically and relatively rapidly. The (co)polyamides according to the invention are particularly used in extrusion and blowmoulding processes for the production of moulded articles, film, composite films, tubes, pipes, semifinished goods and textile components.

The following examples illustrate the invention, without limiting it thereto.

EXAMPLE 1 precursor 10 kg of caprolactam, 1 kg of water, 71.3 g of L-lysine monohydrochloride, 27 g of adipic acid and 15.6 g of NaOH were weighed into a 25 l autoclave and, after inertization, heated at 200° C. under intrinsic pressure for 1 h. The autoclave was then depressurized to atmospheric pressure and simultaneously heated to 270° C. The build-up of the melt viscosity was determined via the rotational speed of a stirrer running under constant power. The desired melt viscosity was achieved after about 1.5 h at 270° C. The stirrer was switched off, and the polyamide was allowed to settle for an hour and then forced out of the vessel using $N_2$. The strands were fed to a chopping machine through a water bath, extracted using $H_2O$ and dried. The product had a relative viscosity of 2.9.

Without an accelerator, about double the time at 270° C. is required in a comparison experiment to achieve the same melt viscosity.

EXAMPLE 2 post-condensation according to the invention

About 50 g of the PA 6 granules obtained according to Example 1 were post-condensed at 170° C. in a stream of nitrogen of 40 l $h^{-1}$ at 50 rev/$min^{-1}$ in a rotary evaporator for 7 h. The results are compiled in Table 1.

COMPARISON EXAMPLE 1

Non-modified PA 6 granules of the same solution viscosity were post-condensed in the same manner as in Example 2. The data are compiled in Table 1.

TABLE 1

| Example | Post-condensation time at 170° (in hours) | $\eta_{rel}$ | MV at 250° C.[1] (Pas) |
|---|---|---|---|
| 2 | 7 | 3.2 | 1325 |
| Starting material (= Ex. 1) | none | 2.9 | 300 |
| Comparison 1 | 7 | 3.2 | about 480 |
| Starting material for Comparison 1 | none | 2.9 | about 190 |

[1]Shear rate 1 s$^{-1}$  MV = melt viscosity

As the examples show, the reaction time until achieving a desired melt viscosity can be considerably reduced or products having a higher melt viscosity can be prepared in the same time by using the accelerator combination according to the invention.

EXAMPLE 3 a) Precursor 92.5 g of ε-caprolactam, 9.4 g of aminocaproic acid, 0.66 g of lysine hydrate and 0.38 g of azelaic acid were weighed into a 250 ml round flask. After inertization with N$_2$, the mixture is heated to 200° C. with stirring and kept at this temperature for 1 h. The mixture is then heated to 270° C. and polycondensed for 70 minutes while stirring slowly. The flask was removed and smashed after the polymer had cooled and the polymer was then chopped and extracted using H$_2$O. The $\eta_{rel}$ value is 2.8 (see Table 2).

b) Solid phase post-condensation

The chopped (co)polyamide according to Example 3a) is post-condensed in a rotating round flask (50 rpm) at 170° C. in an N$_2$ stream (40 l N$_2$/h) for 3 and 7 hours (results see Table 2).

COMPARISON EXAMPLE 2

Polyamide 6 granules of relative viscosity 2.9, which were not lysine-modified, were post-condensed in the same way for 7 h.

The data are to be taken from Table 2.

TABLE 2

| Example No. | Solid phase post-condensation at 170° C. in hours | $\eta_{rel}$ | MV (250° C., 1 s$^{-1}$) |
|---|---|---|---|
| according to Example 3* | 0 | 2.8 | about 400 |
|  | 3 | 3.3 | 1700 |
|  | 7 | 3.9 | 2900 |
| Starting material | 0 | 2.9 | about 190 |
| Comparison | 7 | 3.2 | about 480 |

As the examples show, the use of lysine (derivatives)-/polycarboxyl acid modified polyamides leads to high molecular weight polyamides in a substantially shorter time than the one of comparison products, the solid phase post-condensation being considerably accelerated.

We claim:

1. A process for the solid phase post-condensation of a (co)polyamide prepared by melt polycondensation from at least one lactam, diamine/dicarboxylic acid mixtures, nylon salts or a derivative thereof, or aminocarboxylic acids or a derivative thereof, and a lysine/-polycarboxylic acid reactant, wherein the (co)polyamide contains 0.1 to 2.0% by weight of lysine segments of the formula

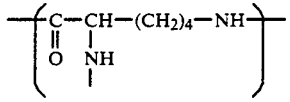

and about equivalent amounts thereto of polycarboxylic acid segments, the process comprising heating the (co)polyamide in vacuo or under an inert gas for 0.5 to 30 hours at a temperature of 140° to 250° C. which is at least 10° C. under the melting point of (co)polyamide.

2. The process of claim 1, wherein the post-condensation is carried out continuously.

3. The process of claim 1, wherein the post-condensation is carried out batchwise.

4. The process of claim 1, wherein the temperature of the heating is 160° to 230° C., and is at least 20° C. under the melting point of the (co)polyamide.

* * * * *